United States Patent
Arnoldussen et al.

(10) Patent No.: US 6,865,041 B1
(45) Date of Patent: Mar. 8, 2005

(54) METHOD AND APPARATUS FOR SERVOWRITING USING A UNIPOLAR WRITE CURRENT

(75) Inventors: Thomas Claude Arnoldussen, Los Altos, CA (US); Roger William Wood, Gilroy, CA (US); Ju-Hi John Hong, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/514,881

(22) Filed: Feb. 29, 2000

(51) Int. Cl.[7] ................................................. G11B 5/09
(52) U.S. Cl. ............................ 360/46; 360/48; 360/75
(58) Field of Search ............................ 360/48, 75, 46, 360/68, 77.12

(56) References Cited

U.S. PATENT DOCUMENTS

| | | | |
|---|---|---|---|
| 5,103,362 A | 4/1992 | Belser et al. | 360/131 |
| 5,333,140 A | 7/1994 | Moraru et al. | 714/719 |
| 5,375,020 A | 12/1994 | Aggarwal et al. | 360/72.1 |
| 5,519,546 A | 5/1996 | Lewis | 360/48 |
| 5,555,482 A | 9/1996 | McNeil | 360/125 |
| 5,689,384 A * | 11/1997 | Albrecht et al. | 360/77.12 |
| 5,867,341 A | 2/1999 | Volz et al. | 360/77.08 |
| 5,909,333 A | 6/1999 | Best et al. | 360/51 |

FOREIGN PATENT DOCUMENTS

| | | |
|---|---|---|
| EP | 194 603 | 9/1986 |
| JP | 62-3474 | 1/1987 |
| JP | 5-303852 | 11/1993 |

* cited by examiner

Primary Examiner—David Hudspeth
Assistant Examiner—Dan I. Davidson
(74) Attorney, Agent, or Firm—Crawford Maunu PLLC (57) ABSTRACT

A method and apparatus for servowriting using a unipolar write current is disclosed. A track for writing a servo pattern is determined and the servo pattern is written using a unipolar write current pulse. The writing of the servo pattern using the unipolar write current pulse creates a servo pattern having less of an erase band and wider track width than if the servo pattern was produced by a bipolar write current pulse. The unipolar write current pulse is applied across a write gap formed by a first pole and a second pole, and wherein a field extension next to the first pole extends further and creates a narrower side erase band than the field proximate to the second pole. The write current pulse width is controlled to set a magnetization length in the servo pattern created in the disk. Analog characteristic of a digital control signal in a variable width pulse generator is set to control a width of the write current pulse to control a magnetization length in the servo pattern created on the disk.

23 Claims, 6 Drawing Sheets

METHOD AND APPARATUS FOR SERVOWRITING USING A UNIPOLAR WRITE CURRENT

BACKGROUND OF THE INVENTION

1. Field of the Invention

This invention relates in general to a head positioning control systems in magnetic storage systems, and more particularly to a method and apparatus for servowriting using a unipolar write current.

2. Description of Related Art

Computer manufacturers have always worked to squeeze more data into smaller spaces. That mission has produced competing and complementary data storage technology including electronic circuits, magnetic media like hard disks and tape, and optical media such as compact disks. Today, companies constantly push the limits of these technologies to improve their speed, reliability, and throughput all while reducing cost. Storage technology has come a long way, and manufacturers continue to improve its speed, reliability, and throughput. Hard disks are the most common type of mass storage device today thanks to their low cost, high speed, and relatively high storage capacity.

One important improvement in hard drives related to increased data density has been in the servo systems. In hard drives, bytes of data are stored on the magnetic medium in sectors. Reading or writing a sector requires knowing the physical location of the data on the media so that the servo controllers can position the read/write heads in the correct location at the appropriate time. Improvements in servo positioning have directly contributed to higher track densities, while advances in rotational position measurement and speed control have sustained track utilization efficiency.

In early disk drives, radial position of data was determined mechanically. Sometimes, open loop stepping systems were used to move the heads, while other drives used relatively crude analog servo systems with feedback from optical or electromagnetic sensors. In such techniques, the number of tracks in a drive was limited by the mechanical resolution, accuracy, and repeatability of the electrical and mechanical components.

Dedicated servo technology began replacing mechanical head positioning starting in the late 1960s. This led to a major increase in attainable track densities. Drives with dedicated servo systems used an entire recording surface to store a set of very accurate servo tracks. As the platters rotated, a head dedicated to the servo surface read the reference track, which determined and controlled the radial position of the head. Since the servo-tracking head was attached to the same actuator mechanism as the read/write heads for data on the other disk surfaces, the exact radial position of all vertically stacked heads was guaranteed. Thus, dedicated servo surfaces allowed the data tracks to be placed more closely together, thereby allowing significant increases in overall data density.

While the dedicated-servo technique significantly increased track density, it did so at the cost of an entire surface of storage space. As track densities increased, other drive design challenges surfaced, e.g., variations in temperature from one platter to another caused a physical difference in the location of tracks from platter to platter. Thus, it became difficult or even impossible to locate tracks of previously recorded data if the ambient temperature changed. So, in the late 1970s, drive designers began investigating and employing several techniques for embedding servo information on each disk surface.

With embedded servo technology, fixed information identifying the radial-head position is pre-recorded in specific areas on all platter surfaces during the manufacturing process. In early disk drives, a scheme that combined both a dedicated servo surface and some embedded servo information was used to form a so-called hybrid servo system. Eventually, the dedicated servo surface was eliminated.

As with dedicated servos, the embedded servo information took up significant recording space within the overall drive volume. But it allowed the drive to continually recalibrate itself, thereby permitting much higher recorded track densities, even in varying ambient temperatures. This gain in total capacity exceeded the capacity overhead required for the servo-control information.

Now, embedded servo information is pre-recorded in dedicated radial spokes, thus dividing the available data-recording space on a platter's surface into fixed wedges. Controlling the number of wedges allows a designer to optimize the media design by trading off head-positioning bandwidth for available storage capacity.

The techniques for determining the rotational position of recorded data has also improved. For example, the mechanical sensing techniques of the earliest drives determined the angular displacement of a data field from an arbitrary fixed point on a disk surface in addition to sensing radial head position. A series of symbol on the circumference of one platter were used for the measurement, with mechanical tolerances again limiting the resolution. Each symbol corresponded to a recorded data sector. When improvements to heads and media subsequently allowed increases per track data density, the fixed mechanical symbols could not be easily changed to allow the disk drive to harness the increased data density.

In the mid-1960s, designers developed recorded headers, which replaced mechanical systems. In doing so, areal densities increased significantly. As noted earlier, headers are simply small data blocks placed in front of each data sector during formatting.

The header area contained the track number, the head number, and the number of the sector that immediately followed the header. Header information allowed the disk controller to confirm the head and the radial track. It also allowed accurate determination of the sector location where the data should be recorded or read. In disk drives with embedded servo fields, the header was expanded to include information that allowed a sector to be split. Accordingly, a part of the sector could be before a servo field and the remaining portion after the servo field. In some systems, a sector was split several times because of sector-size or data-field limitations.

When a read or write is performed, the headers are read and compared with the calculated header to ensure that the correct data field has been located. If the track-number field is incorrect, the servo system is alerted so that the head can be repositioned to the correct track. Similarly, if the head field is incorrect, the drive electronics can select the correct head. If the sector number is incorrect, the controller must merely wait while the disk rotates, until the correct header moves under the read/write head.

Because the track number is confirmed before reading or writing occurs, track density can be improved even beyond the point where the servo system can guarantee exact positioning because positioning errors can be detected and recovered without impacting data reliability. Thus, the headers improve overall reliability by preventing reading or writing of data at wrong locations on the disks.

Prior to the advent of headers, sectors had to be sufficiently distanced from one another to allow for mechanical tolerances and variability. Hence, there were large gaps between sectors; headers narrowed these gaps. Compared with older drives, the storage area used for the headers was almost free. But the improvements in overall data density, due to increased bit and track densities, were significant.

Recent advances in head design, specifically the development of MR heads, significantly increased the header overhead because of their physical design, i.e., MR heads require double headers to accommodate the physical separation of read (MR) and write (inductive) elements of the heads. Accordingly, with MR heads, as much as ten percent of a drive's total storage capacity can be dedicated to the header information.

Today, the header is often eliminated entirely. This allows the drive controller to make full use of information stored in the embedded servo field. With that information, the controller can determine the correct combination of head, cylinder, and sector that uniquely designates the location of a data field recorded on the media. The controller can find the head position and the sector location within each servo-defined wedge. Use of the servo synchronization field to recalibrate internal logic ensures accuracy.

The sector layout of the headerless-formatting system looks much like that of header-based systems, but with the obvious lack of a header. Headerless formatting technique uses new information (stored in the embedded servo field) to exactly determine the rotational position of any and all sectors. The servo field contains a servo synchronization pulse used to determine the current wedge position. The sector location within each wedge, relative to the nearest servo sync pulses, is governed by rotational speed. That allows the controller to set a fixed window, with a width that depends on the speed tolerance of the drive, to test the validity of sync pulses received. Multiple track formats are supported, allowing the controller to support multiple zones. That, in turn, permits maximum recording densities to be used throughout the media, while maintaining the integrity of data recovery.

For maximum bit packing, the headerless formatting system allows sectors to be split anywhere after the first byte of data or before the last byte of data in the ECC fields. Thus, the headerless scheme represents a tremendous improvement over header-based systems, which limited sector splitting because of difficulty in handling sector fragments.

The embedded servo field typically includes a digital field containing cylinder number information (indicating which track a head is positioned over) with additional bits indicating the current head being read and the current servo-field number.

Writing servo patterns on a DC erased disk produces servo patterns made of two alternating transition types. One is produced along the trailing edge of the write-gap. The other transition is produced along the leading edge of the write-gap.

However, the side erase band and the curved transition at the track edges have a detrimental effect on the servo signal. These edge effects are usually controlled by reducing the write current during servowrite and also by careful head design and using high coercivity disks. Still, the side effects are not eliminated.

It can be seen that there is a need for a method and apparatus that produces servo patterns while reducing the edge effects.

It can also be seen that there is a need for a method and apparatus that increases the written track width beyond that produced by the conventional bipolar write current during servowriting.

SUMMARY OF THE INVENTION

To overcome the limitations in the prior art described above, and to overcome other limitations that will become apparent upon reading and understanding the present specification, the present invention discloses a method and apparatus for servowriting using a unipolar write current.

A method in accordance with the principles of the present invention includes determining a track for writing a servo pattern and writing the servo pattern using a unipolar write current pulse.

Other embodiments of a method in accordance with the principles of the invention may include alternative or optional additional aspects. One such aspect of the present invention is that the writing of the servo pattern using the unipolar write current pulse creates a servo pattern having less of an erase band and wider track width than if the servo pattern was produced by a bipolar write current pulse.

Another aspect of the present invention is that the unipolar write current pulse is applied across a write gap formed by a first pole and a second pole, and wherein a field extension next to the first pole extends further and creates a narrower side erase band than the field proximate to the second pole.

Another aspect of the present invention is that the write current pulse writing the servo pattern using a unipolar write current pulse further comprises controlling a width of the write current pulse to control a magnetization length in the servo pattern created in the disk.

Another aspect of the present invention is that the writing the servo pattern using a unipolar write current pulse further includes generating a write current control signal in response to receiving a servo data signal from the servo write controller and generating a unipolar write current pulse across a head in response to the write current control signal to write a servo pattern on a disk.

Another aspect of the present invention is that the generating a write current control signal in response to receiving a servo data signal from the servo write controller further includes generating a ramped voltage signal in response to a first state of the servo data signal, receiving a programmable digital control signal and converting the programmable digital control signal to an analog output signal, the analog output signal having an analog characteristic set by the programmable digital control signal, receiving the ramped voltage signal and the analog output signal and generating a reset signal when the ramped voltage signal matches the analog characteristic of the analog output signal set by the programmable digital control signal and receiving the reset signal and the servo data signal to set a flip-flop, the setting of the flip-flop providing the write current control signal for causing the write generator to generate the unipolar write current to the head.

Another aspect of the present invention is that a ramp generator is reset for generating the ramp signal when the flip-flop receives the reset signal.

Another aspect of the present invention is that the setting of the flip-flop provides a write current control signal having a low logic level to turn on the write current.

Another aspect of the present invention is that the write current control signal is received at a first switch, the first switch being turned off to turn on the write current and turned on to turn off the write current.

Another aspect of the present invention is that the high logic level for the write current control signal is raised using a level converter so that the first switch deprives the write current from the head.

Another aspect of the present invention is that a first switch pair and a second switch pair is driven with a write signal to apply to the disk a magnetic field polarized in a first direction from the head.

Another aspect of the present invention is that the write current is deprived from the head using the first switch when the first and second switch pair are driven by a write signal to apply to the disk a magnetic field polarized in a second direction from the head.

Another aspect of the present invention is that the analog characteristic is set to control a width of the write current pulse to control a magnetization length in the servo pattern created on the disk.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention produces servo patterns while reducing the edge effects using a unipolar write current pulse. The written track width is increased beyond that produced by the conventional bipolar write current during servowriting.

Figure 1:
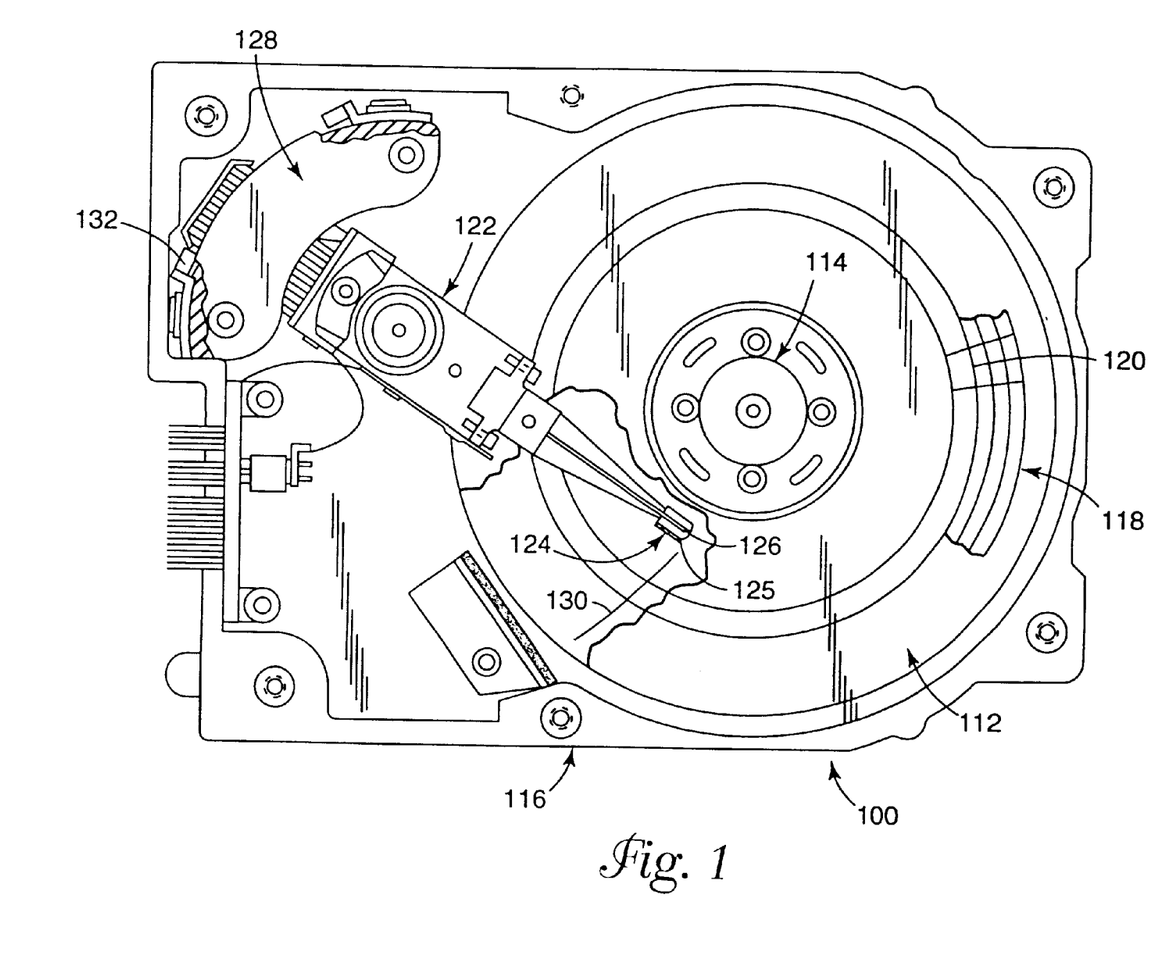
FIG. 1 illustrates a rotary magnetic disk drive system suitable for incorporating the teachings of the present invention.

FIG. 1 illustrates a rotary magnetic disk drive system 100 suitable for incorporating the teachings of the present invention. In FIG. 1, a plurality of magnetic information storage disks 112 are journaled about a spindle motor assembly 114 within a housing 116. Each magnetic disk 112 has a multiplicity of concentric circular recording tracks 118, which are subdivided into sectors 120. Data can be stored on or retrieved from the disks 112 by referencing a specific track 118 and sector 120.

An actuator arm assembly 122 is rotatably mounted preferably in one corner of the housing 116. The actuator arm assembly 122 carries a plurality of head gimbal assemblies 124. Each of the head gimbal assemblies 124 carry a slider 125 having a read/write head, or transducer 126 for reading information from and writing information onto the magnetic disks 112. Transducer 126 may, for example, include a thin film head, an MR head or a GMR head.

A voice coil motor 128 is adapted to precisely rotate the actuator arm assembly 122 back and forth such that the transducers 126 move across the magnetic disks 112 along an arc 130. The disk drive system 100 also includes control circuitry 132 for processing information to be written to or received from the disks 112 and controlling the position of the transducers 126.

Figure 2:
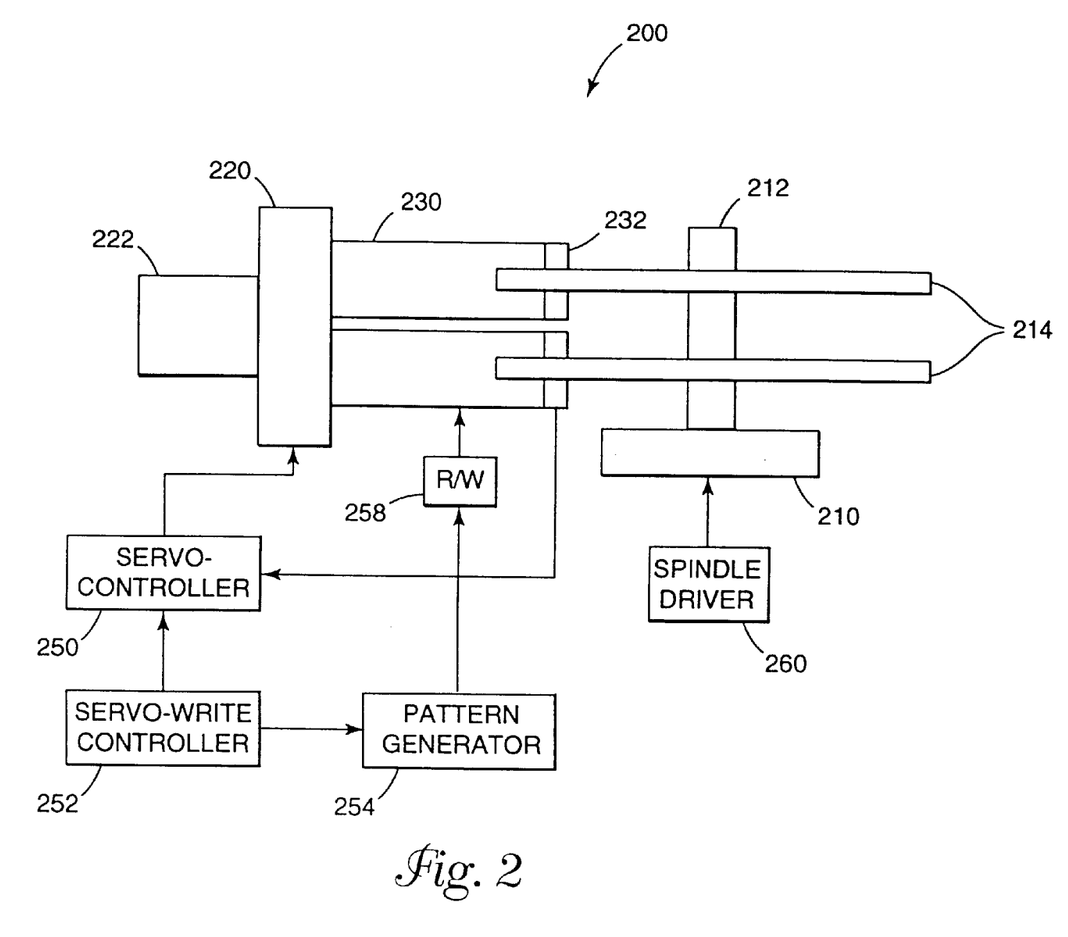
FIG. 2 illustrates a block diagram of a disk drive suitable for incorporating the teachings of the present invention.

FIG. 2 illustrates a block diagram of a disk drive 200 suitable for incorporating the teachings of the present invention. In FIG. 2, a spindle motor includes a spindle 212 having two disks 214 attached thereto. An actuator assembly 220 carries a plurality of head gimbal assemblies 230 including a read/write head, or transducer 232 for reading information from and writing information onto the magnetic disks 214. A voice coil motor 222 is adapted to precisely rotate the actuator assembly 220 back and forth such that the transducers 232 move across the magnetic disks 214 along an arc as illustrated in FIG. 1.

A servo write controller 250 controls the voice coil motor to move the actuator assembly 220 to accurately position the transducers 232 at a desired position on the disks 214. A spindle driver 260 controls the spindle motor 210 to rotate the disks 214.

A servowriter includes a servo-write controller 252 and a pattern generator 254. The servo-write controller 252 operates to control the servo-controller 250 to accurately position the transducers 232 and to cause a pattern generator 254 to write a servo pattern on a disk using a unipolar write current in response to receiving the servo signal.

The pattern generator 254 generates the servo pattern to be written to the disks 214 via transducers 232. The pattern generator 254 sends the appropriate servo pattern to the read/write amplifier 258. The read/write amplifier 258 properly conditions the servo signals to ensure the desired magnetic transition pattern is written onto the disks 214.

Those skilled in the art will recognize that the present invention is not meant to be limited to a servo-writing system illustrated in the block diagram illustrated in FIG. 2. Rather, the servo-writing system illustrated in the block diagram illustrated in FIG. 2 is just one example of a system for writing servo patterns according to the present invention.

Figure 3:
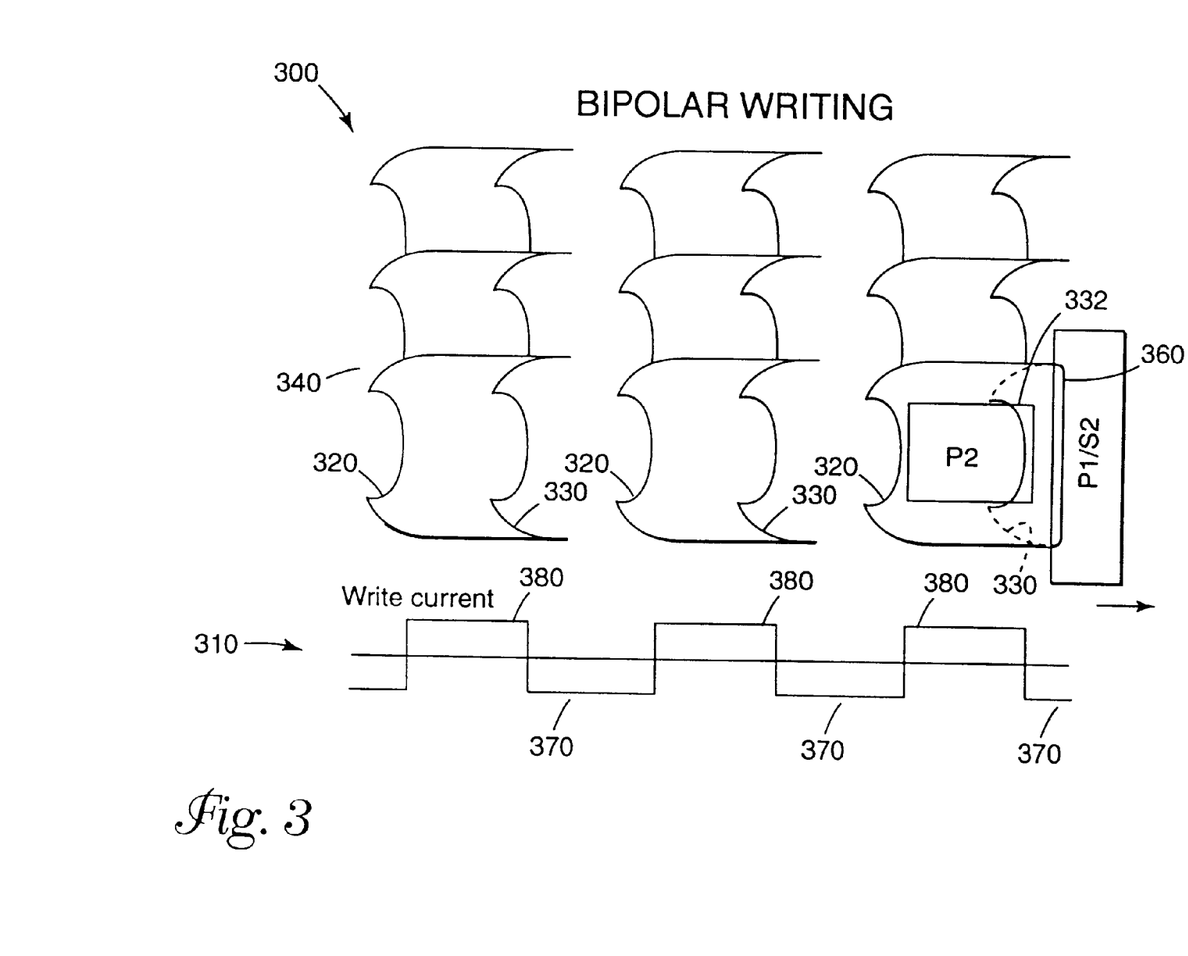
FIG. 3 illustrates a servo pattern that is written using a bipolar signal according to the prior art.

FIG. 3 illustrates a servo pattern 300 that is written using a bipolar signal 310 according to the prior art. As can be seen in FIG. 3, servo patterns written on a DC erased disk include two alternating transition types. The first transition 320 is produced by a "−"370 to "+"380 transition of the write current. The other transition 330 is produced by a "+"380 to "−"370 transition of the write current. The side erase band and the curved transition 340 at the track edges have a detrimental effect on the servo signal. These edge effects 340 are usually controlled by reducing the write current 310 during servowrite and also by careful head design and using high coercivity disks. However, the side effects 340 are not eliminated. The contour of the head field 360 whose magnitude is equal to the coercivity is visible in FIG. 3.

Figure 4:
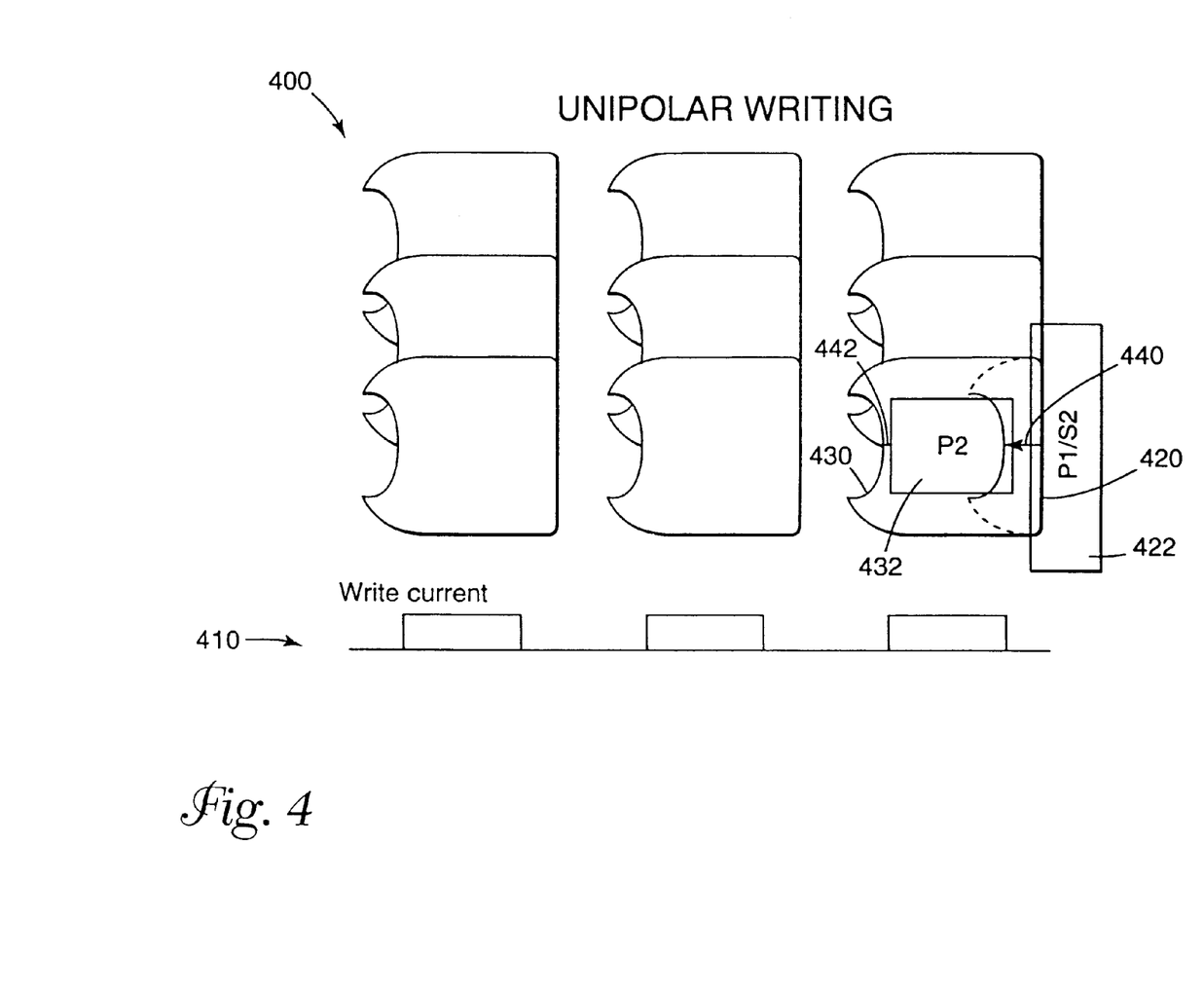
FIG. 4 illustrates the magnetization of a servo pattern written using a unipolar write current according to the present invention.

FIG. 4 illustrates the magnetization of a servo pattern 400 written using a unipolar write current 410 according to the present invention. The written servo pattern includes two alternating transition types: a first transition type 420 is written by the field next to the P1 pole 422 and the second transition type 430 is written in the normal manner by the field near the P2 pole 432. In FIG. 4, it is clear that the field extension 440 next to the P1 pole 422 extends out further and has a narrower side erase band than the field 442 next to the P2 pole 432. Therefore, the resulting servo pattern has on the average a reduce erase band and wider track width than that produced by the bipolar write current 310 illustrated with reference to FIG. 3.

Figure 5:
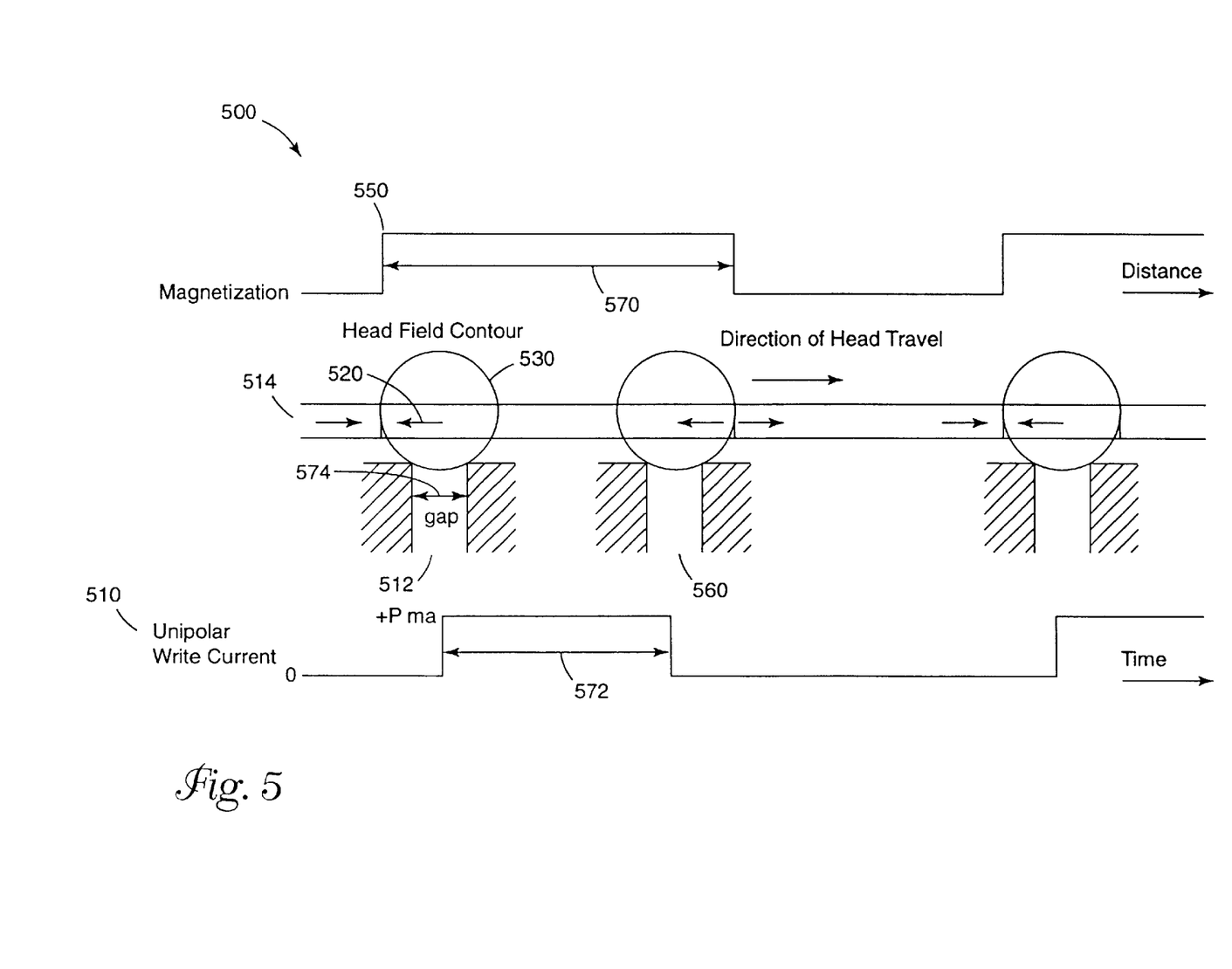
FIG. 5 illustrates the effect of the unipolar write pulse on the width of the magnetization.

FIG. 5 illustrates the effect of the unipolar write pulse on the width of the magnetization 500. In FIG. 5, the unipolar write pulse 510 is shown to correspond to a position of the write gap 512 relative to the surface of the disk 514. The disk 514 is moving to the left. Thus, the write gap 512 appears to be moving to the right. The write pulse 510 causes the flux across the write gap, which reverses the magnetization 520 on the disk. The head field contour is represented by the circle 530 for simplicity. Note the plot of the magnetization 550 is aligned with the left edge of the head field contour 530 at initiation of the unipolar write current 510. In position two 560, the unipolar write current 510 is turned off. The magnetization plot 550 is continuous until aligned with the right side of the head field contour. Thus, in the down track direction, the length 570 of the reverse magnetization plot 550 is longer than the length 572 of the unipolar pulse by approximately twice the length 574 of the head gap 512. Therefore, it is necessary to shorten the width 572 of the unipolar pulse 510 appropriately, while taking into account the disk velocity variation along the radius, to ensure that the magnetization areas are of equal length, i.e., so that the graph of the magnetization 550 in FIG. 5 exhibits a 50% duty cycle.

Figure 6:
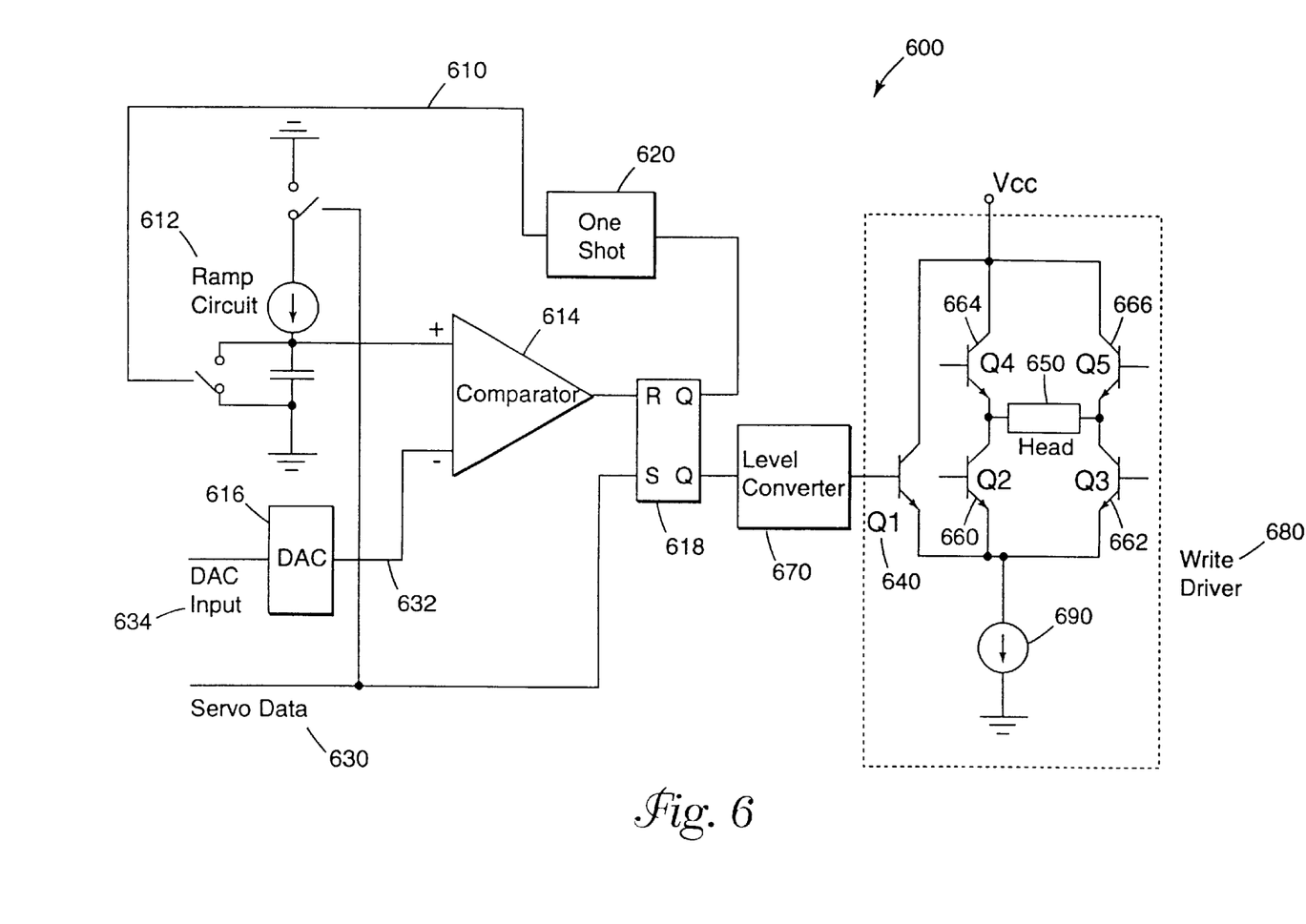
FIG. 6 illustrates a block diagram of an embodiment of a servowriter according to the present invention.

FIG. 6 illustrates a block diagram 600 of an embodiment of a servowriter according to the present invention. Prior to servowriting, all the disks in the hard disk assembly need to be DC erased. Those skilled in the art will recognize that this may be performed using any of several bulk erase methods.

The difference from the conventional servowriter is the addition of the variable pulse width generator circuit and the modified write driver that can be turned on and off at the data rate, i.e., in a few nanoseconds.

The variable width pulse generator 610 includes a ramp voltage generator 612, a comparator 614, a digital-to-analog converter (DAC) 616, a set/reset flip-flop 618 and a one-shot circuit 620. A "+" edge of the servo data 630 starts the ramp generator 612 and sets the flip-flop 618 ($\overline{Q}$ goes low) and turns off transistor Q1 640. The write current starts flowing through the head. When the ramp voltage reaches the level of the DAC output 632, the flip-flop 618 is reset and the switch (e.g., transistor Q1 640) is turned on to turn off current into the head 650. In this way, the turn-off of the write current is delayed by an amount programmable via the DAC input 634. The ramp generator 610 is reset by a pulse generated by the one-shot circuit 620 when the flip-flop 618 is reset.

A logic level conversion circuit 670 is disposed between the write driver 680 and the ramp generator 610. The logic level conversion circuit 670 raises the high logic level, for example by 150 millivolts, without changing the low logic level. Those skilled in the art will recognize that the present invention is not meant to be limited to a rise in the logic level of 150 millivolts. Rather, the logic level conversion circuit 670 may be designed to raise the high logic level output by any suitable amount. Thus, when Q1 640 is driven by the high logic level from the logic level conversion circuit 670, the current to the current source 690 is supplied solely by Q1 640 regardless of the states of Q2–Q5. When the logic level is low, Q1 640 is off and the write driver operates in the normal manner. Those skilled in the art will recognize the base of Q2–Q5 660–666 are connected to differential write signals as known in the prior art. For example, Q4 664 and Q3 662 may be turned on and Q2 660 and Q5 666 turned off so that current flows through head 650 from left to right to apply a magnetic field polarized in a first direction.

Q2 660 and Q5 666 may be turned on and Q4 664 and Q3 662 turned off so that current flows through head 650 from right to left to apply a magnetic field polarized in a second direction. However, as stated above, when Q1 640 is driven by the high logic level from the logic level conversion circuit 670, the current to the current source 690 is supplied solely by Q1 640 regardless of the states of Q2–Q5.

The initial pulse width needed at the staff of the servowrite needs to be determined for each head and disk combination for optimum servowriting. There are several methods for doing this. One method is to measure the time interval between successive peaks of the peak detected readback signal of a low frequency square wave using a time interval analyzer (not shown). Once the initial pulse width is determined, the DAC input 634 is slowly decreased as the head is moved from the outer radius to the inner radius in a manner predetermined by the disk rotational speed. This writing technique places a limitation on the maximum PES frequency, which is upper bounded by the inverse of the time interval difference between successive peaks of a low frequency square waive recording.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for servowriting, comprising:
   determining a track for writing a servo pattern;
   writing the servo pattern using a unipolar write current pulse, and
   controlling a width of the unipolar write current pulse to provide a magnetization length in the servo pattern created on a disk.

2. The method of claim 1 wherein the writing of the servo pattern using the unipolar write current pulse further comprises providing a servo pattern having less of an erase band and wider track width than a servo pattern produced by a bipolar write current pulse.

3. The method of claim 1 wherein the unipolar write current pulse is applied across a write gap formed by a first pole and a second pole, and wherein a field extension next to the first pole extends further and creates a narrower side erase band than a field proximate to the second pole.

4. The method of claim 1 wherein the writing the servo pattern using a unipolar write current pulse further comprises:

generating a write current control signal in response to receiving a servo data signal from a servo write controller; and generating a unipolar write current pulse across a write gap of a head in response to the write current control signal to write a servo pattern on a disk.

5. The method of claim 4 wherein the generating a write current control signal in response to receiving a servo data signal from the servo write controller further comprises:

generating a ramped voltage signal in response to a first state of the servo data signal;

receiving a programmable digital control signal and converting the programmable digital control signal to an analog output signal, the analog output signal having an analog characteristic set by the programmable digital control signal;

receiving the ramped voltage signal and the analog output signal and generating a reset signal when the ramped voltage signal matches the analog characteristic of the analog output signal set by the programmable digital control signal; and receiving the reset signal and the servo data signal to control a flip-flop, a setting of the flip-flop providing the write current control signal for causing a write generator to generate the unipolar write current pulse across a write gap of the head.

6. The method of claim 5 further comprising resetting a ramp generator for generating the ramped signal when the flip-flop receives the reset signal.

7. The method of claim 5 wherein the setting of the flip-flop provides a write current control signal having a low logic level to turn on the write current.

8. The method of claim 7 further comprising receiving the write current control signal at a first switch, the first switch being turned off to turn on the write current and turned on to turn off the write current.

9. The method of claim 8 further comprising raising a high logic level for the write current control signal using a level converter so that the first switch deprives the write current from the head.

10. The method of claim 9 further comprising driving a first switch pair and a second switch pair with a write signal to apply to the disk a magnetic field polarized in a first direction from the head.

11. The method of claim 9 further comprising depriving the write current from the head using the first switch when the first and second switch pair are driven by a write signal to apply to the disk a magnetic field polarized in a second direction from the head.

12. The method of claim 5 further comprising setting the analog characteristic to control a width of the write current pulse to control a magnetization length in the servo pattern created on the disk.

13. A servowriter comprising:

a variable width pulse generator for generating a write current control signal in response to receiving a servo data signal from the servo write controller;

a write current generator for generating a unipolar write current pulse across a write gap of a head in response to the write current control signal to write a servo pattern on a disk, and a digital-to-analog converter for controlling a width of the unipolar write current pulse to provide a magnetization length in the servo pattern created on the disk.

14. The servowriter of claim 13 wherein the variable width pulse generator further comprises:

a ramp voltage generator for generating a ramped voltage signal in response to a first state of the servo data signal;

the digital-to-analog converter (DAC) for receiving a programmable digital control signal and converting the programmable digital control signal to an analog output signal, the analog output signal having an analog characteristic set by the programmable digital control signal;

a comparator for receiving the ramped voltage signal and the analog output signal and generating a reset signal when the ramped voltage signal matches the analog characteristic of the analog output signal set by the programmable digital control signal; and a flip-flop, coupled to the comparator, for receiving the reset signal and the servo data signal, the flip-flop providing the write current control signal for causing the write generator to generate the unipolar write current pulse across a write gap of the head.

15. The servowriter of claim 14 wherein the variable width pulse generator further comprises a one-shot circuit, wherein the ramp generator is reset by a pulse generated by the one-shot circuit when the flip-flop receives the reset signal.

16. The servowriter of claim 14 wherein the setting of the flip-flop provides a write current control signal having a low logic level to the write generator to turn on the write current generator in response to the flip-flop receiving the first state of the servo data signal.

17. The servowriter of claim 16 wherein the write current generator further comprises a first switch, the first switch receiving the write current control signal, the switch being turned off to turn on the write current and turned on to turn off the write current.

18. The servowriter of claim 17 further comprising a level converter, disposed between the write generator and the variable width pulse generator, for raising the high logic level for the write current control signal so that the first switch deprives the write current from the head.

19. The servowriter of claim 18 wherein the write generator further comprises a first switch pair and a second switch pair, the first and second switch pair being driven by a write signal to apply to the disk a magnetic field polarized in a first direction from the head.

20. The servowriter of claim 18 wherein the first switch deprives the write current from the head when the first and second switch pair are driven by a write signal to apply to the disk a magnetic field polarized in a second direction from the head.

21. The servowriter of claim 14 wherein the analog characteristic set by the programmable digital control signal controls a width of the write current pulse to control a magnetization length in the servo pattern created on the disk.

22. The servowriter of claim 13 wherein the writing of the servo pattern using the unipolar write current creates a servo pattern having less of an erase band and wider track width than if the servo pattern was produced by a bipolar write current.

23. The servowriter of claim 13 wherein the unipolar write current is applied across a write gap formed by a first pole and a second pole, and wherein a field extension next to the first pole extends further and creates a narrower side erase band than a field proximate to the second pole.

* * * * *

UNITED STATES PATENT AND TRADEMARK OFFICE
CERTIFICATE OF CORRECTION

PATENT NO. : 6,865,041 B1
DATED : March 8, 2005
INVENTOR(S) : Arnoldussen et al.

It is certified that error appears in the above-identified patent and that said Letters Patent is hereby corrected as shown below:

Column 8,
Line 24, "staff" should read -- start --.

Signed and Sealed this

Twenty-seventh Day of December, 2005

JON W. DUDAS
*Director of the United States Patent and Trademark Office*